United States Patent
Yabe (10) Patent No.: US 10,409,458 B2
(45) Date of Patent: Sep. 10, 2019

(54) IMAGE PROCESSING APPARATUS, METHOD FOR CONTROLLING OPERATION OF IMAGE PROCESSING APPARATUS, AND RECORDING MEDIUM

(71) Applicant: Hirohisa Yabe, Kanagawa (JP)

(72) Inventor: Hirohisa Yabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 324 days.

(21) Appl. No.: 15/186,824

(22) Filed: Jun. 20, 2016

(65) Prior Publication Data

US 2017/0017358 A1     Jan. 19, 2017

(30) Foreign Application Priority Data

Jul. 13, 2015 (JP) ................................. 2015-139796

(51) Int. Cl.
G06F 3/0482 (2013.01)
H04N 1/00 (2006.01)

(52) U.S. Cl.
CPC ....... *G06F 3/0482* (2013.01); *H04N 1/00411* (2013.01); *H04N 1/00517* (2013.01); *H04N 1/00832* (2013.01); *H04N 1/00938* (2013.01)

(58) Field of Classification Search
CPC .............. G06F 3/0482; H04N 1/00411; H04N 1/00938; H04N 2201/0094
See application file for complete search history.

(56) References Cited

U.S. PATENT DOCUMENTS

| | | | | |
|---|---|---|---|---|
| 6,421,509 B1 * | 7/2002 | Nomura | ............. | H04N 1/00384 399/81 |
| 9,460,159 B1 * | 10/2016 | Mostowy | ............. | G06F 17/3089 |
| 2005/0050550 A1 * | 3/2005 | Fuller | ................... | G06F 9/4881 719/319 |
| 2006/0225038 A1 | 10/2006 | Okabe | | |
| 2008/0177994 A1 * | 7/2008 | Mayer | ................... | G06F 9/4418 713/2 |
| 2011/0231800 A1 * | 9/2011 | Tomita | ................... | G06F 3/0482 715/835 |
| 2013/0088735 A1 * | 4/2013 | Cho | ................... | H04N 1/00411 358/1.13 |
| 2013/0135644 A1 * | 5/2013 | Sato | ................... | H04N 1/00411 358/1.13 |

(Continued)

FOREIGN PATENT DOCUMENTS

JP     2006-259873     9/2006

*Primary Examiner* — Shourjo Dasgupta
(74) *Attorney, Agent, or Firm* — Harness, Dickey & Pierce P.L.C.

(57) ABSTRACT

An image processing apparatus includes a user interface and circuitry. The user interface displays a screen including a plurality of graphical representations corresponding to a plurality of application programs being installed on the image processing apparatus. The circuitry counts a number of times of use, for each of the plurality of application programs, each time of use being counted when the application has been activated for at least a predetermined time period, selects one of the plurality of application programs having the greatest counted number of times of use, as the application program that is most frequently used, and controls the user interface to automatically display an operation screen of the selected application program, when the image processing apparatus is in an unused state.

20 Claims, 10 Drawing Sheets

(56) References Cited

U.S. PATENT DOCUMENTS

2015/0025972 A1   1/2015  Yabe
2015/0112752 A1*  4/2015  Wagner ............ G06Q 10/06316
                                                      705/7.26
2016/0328334 A1* 11/2016  Mese ................... G06F 12/123

* cited by examiner

| PRIORITY DISPLAY SETTING ITEM | SETTING |
|---|---|
| PRIORITY DISPLAY SETTING | TARGET APPLICATION OR DISABLE |
| PRIORITY DISPLAY SETTING FOR EACH TIME SLOT | ENABLE OR DISABLE |
| PRIORITY DISPLAY SETTING FOR EACH TIME SLOT (AUTO) | ENABLE OR DISABLE |

FIG. 9

| TIME SLOT SETTING FOR PRIORITY DISPLAY SETTING | TARGET APPLICATION |
|---|---|
| 0:00–9:00 | COPY |
| 9:00–15:00 | SCANNER |
| 15:00–20:00 | FAX |
| 21:00–22:00 | DISABLE |
| OTHER TIME SLOTS | COPY |

FIG. 11

| SETTING FOR INDIVIDUAL APPLICATION | SET PERIOD OF TIME |
|---|---|
| COPY APPLICATION | 15 SECONDS |
| SCANNER APPLICATION | NO SETTING |
| ... | ... |
| DICTIONARY APPLICATION | 30 SECONDS |

FIG. 12

| TIME SLOT | NUMBER OF TIMES APPLICATION IS USED |
|---|---|
| 0:00-0:30 | COPY (300 TIMES), SCANNER (10 TIMES)... |
| 0:30-1:00 | COPY (10 TIMES), SCANNER (100 TIMES)... |
| 1:00-1:30 | COPY (1 TIME), SCANNER (10 TIMES)... |
| 1:30-2:00 | COPY (1 TIME), SCANNER (10 TIMES)... |
| ... | COPY (1 TIME), SCANNER (10 TIMES)... |
| ... | ... |
| 23:30-24:00 | COPY (300 TIMES), SCANNER (1 TIME)... |

| APPLICATION | NUMBER OF TIMES APPLICATION IS USED |
|---|---|
| COPY | 300 TIMES··· |
| PRINTER | 100 TIMES··· |
| SCANNER | 35 TIMES··· |
| FAX | 60 TIMES··· |
| ··· | ··· |
| ··· | ··· |

IMAGE PROCESSING APPARATUS, METHOD FOR CONTROLLING OPERATION OF IMAGE PROCESSING APPARATUS, AND RECORDING MEDIUM

CROSS-REFERENCE TO RELATED APPLICATIONS

This patent application is based on and claims priority pursuant to 35 U.S.C. § 119(a) to Japanese Patent Application No. 2015-139796, filed on Jul. 13, 2015 in the Japan Patent Office, the entire disclosures of which are hereby incorporated by reference herein.

BACKGROUND

Technical Field

The present disclosure relates to an image processing apparatus, a method for controlling operation of an image processing apparatus, and a non-transitory recording medium.

Description of the Related Art

Image processing apparatuses, such as printers or facsimiles that output digitized information and scanners that digitize documents, play an important role in a recent trend toward digitization of information. Multifunction peripherals (MFPs) are a typical example of such image processing apparatuses, which have multiple functions such as an imaging function, an image forming function, and a communication function to be used as a printer, a facsimile, a scanner, and a copier.

Recent image processing apparatuses often include a control panel implemented by a liquid crystal display (LCD) that supports a touch panel system. The image processing apparatus controls execution of various functions in response to a signal input from the control panel according to a user operation. Accordingly, if a specific function that is used frequently by a user is activated readily, a user is able to use the image processing apparatus in a more convenient manner.

SUMMARY

An image processing apparatus includes a user interface and circuitry. The user interface displays a screen including a plurality of graphical representations corresponding to a plurality of application programs being installed on the image processing apparatus. The circuitry counts a number of times of use, for each of the plurality of application programs, each time of use being counted when the application has been activated for at least a predetermined time period, selects one of the plurality of application programs having the greatest counted number of times of use, as the application program that is most frequently used, and controls the user interface to automatically display an operation screen of the selected application program, when the image processing apparatus is in an unused state.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

An exemplary embodiment of the present invention will be described hereinafter with reference to drawings. In this embodiment, a description is given of an image processing apparatus that is capable of processing data transmitted from an information processing device such as a personal computer, a smartphone, or a tablet computer connected to the image processing apparatus via a network.

Figure 1:
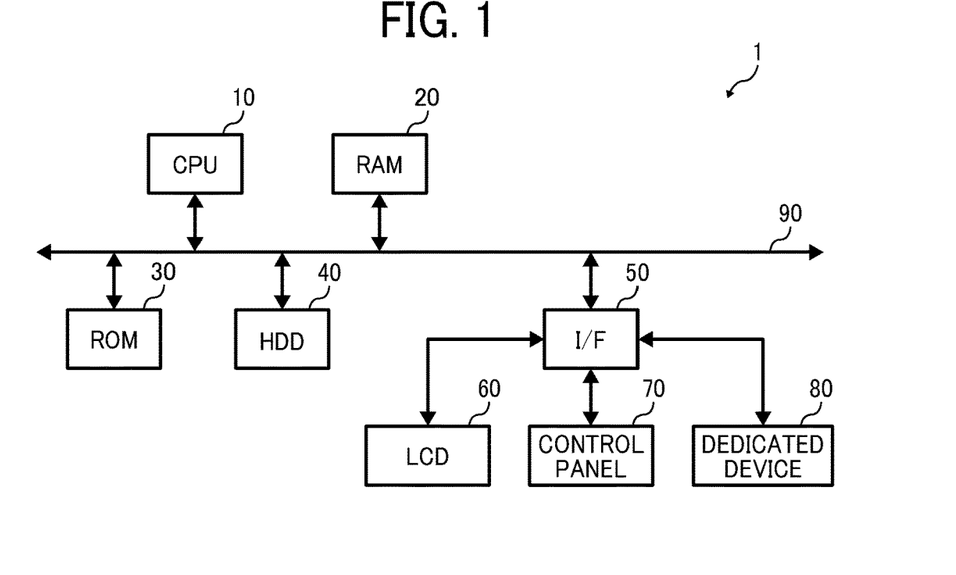
FIG. 1 is a block diagram illustrating a hardware configuration of an image processing apparatus according to an embodiment of the present invention.

First, a description is given of an exemplary hardware configuration of an image processing apparatus 1 according to this embodiment. FIG. 1 is a block diagram illustrating an exemplary hardware configuration of the image processing apparatus 1 according to this embodiment. As illustrated in FIG. 1, the image processing apparatus 1 according to this embodiment has substantially the similar configuration to that of an information processing apparatus such as a general personal computer (PC) or server. Specifically, the image processing apparatus 1 according to this embodiment includes, a central processing unit (CPU) 10, a random access memory (RAM) 20, a read only memory (ROM) 30, a hard disc drive (HDD) 40, and an interface (I/F) 50, which are connected to one another via a bus 90. In addition, the image processing apparatus 1 includes a liquid crystal display (LCD) 60, a control panel 70, and a dedicated device 80, which are connected to the I/F 50.

The CPU 10 is a processor, which controls an entire operation of the image processing apparatus 1. The RAM 20 is a high-speed read/write volatile storage medium. The CPU 10 uses the RAM 20 as a work area when processing data. The ROM 30 is a read-only non-volatile storage medium that stores programs such as firmware. The HDD 40 is a read/write non-volatile storage medium that stores an operating system (OS), various control programs, and application programs. The application program will be referred to as an "application" hereinafter.

The I/F 50 connects the bus 90 to various hardware resources or a network for control. The LCD 60 is a visual user interface that allows a user to recognize a status of the image processing apparatus 1. The control panel 70 is a user interface that allows a user to input data to the image processing apparatus 1. In this embodiment, the control panel 70 includes a touch panel and a hardware key.

The dedicated device 80 is hardware for implementing a specific function of the image processing apparatus 1. Specifically, the dedicated device 80 includes, for example, a print engine 106 (FIG. 2) that forms an image on a recording sheet for output, or a scanner 102 (FIG. 2) that scans the image formed on the recording sheet.

Figure 2:
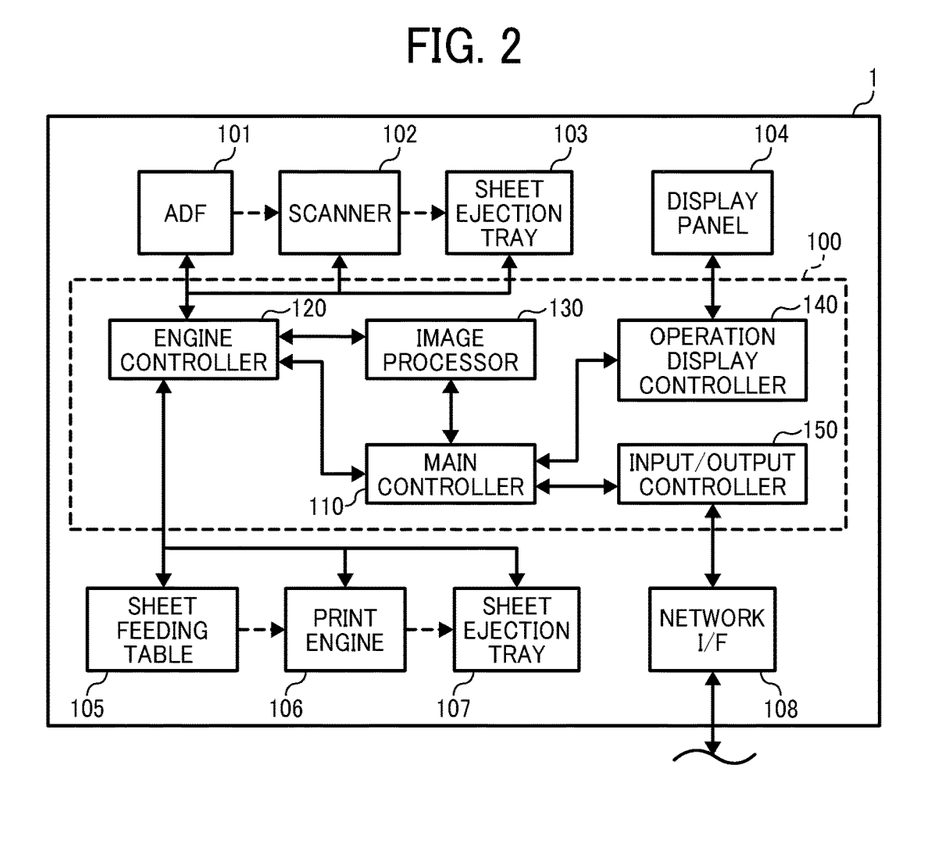
FIG. 2 is block diagram illustrating a configuration of a software controller of the image processing apparatus of FIG. 1, which cooperates with hardware, according to this embodiment.

With such hardware configuration, the CPU 10 executes processing according to a program that is stored in the ROM 30, the HDD 40 or a recording medium such as an optical disc and loaded to the RAM 20 to function as a software controller. The software controller operates in cooperation with hardware to implement one or more functional blocks of the image processing apparatus 1 as illustrated in FIG. 2.

Hereinafter, a description is given of an exemplary functional configuration of the software controller of the image processing apparatus 1 according to this embodiment with reference to FIG. 2. FIG. 2 is a block diagram illustrating a configuration of the software controller of the image processing apparatus 1, which cooperates with hardware, according to this embodiment. As illustrated in FIG. 2, the image processing apparatus 1 according to this embodiment includes a controller 100, an automatic document feeder (ADF) 101, the scanner 102, a sheet ejection tray 103, a display panel 104, a sheet feeding table 105, the print engine 106, a sheet ejection tray 107, and a network I/F 108.

The controller 100 includes a main controller 110, an engine controller 120, an image processor 130, an operation display controller 140, and an input/output controller 150. As illustrated in FIG. 2, the image processing apparatus 1 according to this embodiment is a multifunction peripheral that includes the scanner 102 and the print engine 106. In FIG. 2, an electrical connection is indicated by a solid line while a flow of recording sheet is indicated by a dashed line.

The display panel 104 is an output interface that visually displays a status of the image processing apparatus 1. In addition, the display panel 104 is also an input interface implemented by, for example, a touch panel that allows a user to directly operate the image processing apparatus 1 or input data to the image processing apparatus 1. In other words, the display panel 104 also displays an image that allows a user to input a user instruction. The display panel 104 is implemented by the LCD 60 and the control panel 70 illustrated in FIG. 1.

The network I/F 108 is an interface that allows the image processing apparatus 1 to communicate with another device via a network. The network I/F 108 is compliant with Ethernet (registered trademark) or a universal serial bus (USB), for example. The network I/F 108 supports communications by TCP/IP protocol. In addition, the network I/F 108 also functions as an interface for executing a facsimile transmission when the image processing apparatus 1 operates as a facsimile machine. For this reason, the network I/F 108 is also connected to a telephone line. The network I/F 108 is implemented by the I/F 50 illustrated in FIG. 1.

The controller 100 is implemented by a combination of software and hardware. Specifically, a program that is stored in a nonvolatile memory such as the ROM 30 or a non-volatile storage medium such as the HDD 40 or an optical disc is loaded to a volatile memory such as the RAM 20. The CPU 10 performs processing according to the program loaded to the RAM 20 to implement a software controller. The controller 100 is implemented by a combination of the software controller and hardware such as integrated circuit. The controller 100 controls entire operation of the image processing apparatus 1.

The main controller 110 controls each unit included in the controller 100 and gives an instruction to each unit of the controller 100. The engine controller 120 functions as a driver that controls or drives the print engine 106 or the scanner 102. The image processor 130 generates drawing data based on image information to be output for printing under control of the main controller 110. This drawing data is information used by the print engine 106, which functions as an image forming unit, to form an image on a recording sheet.

Further, the image processor 130 also processes captured data that is input from the scanner 102 to generate image data. This image data is obtained as a result of scanning operation by the scanner 102 and stored in a storage area of the image processing apparatus 1. Alternatively, the obtained image data is sent to an external information processing terminal or an external memory via the network I/F 108.

The operation display controller 140 displays data on the display panel 104. In addition, the operation display controller 140 sends data that is input via the display panel 104 to the main controller 110. The input/output controller 150 inputs data that is input via the network I/F 108 to the main controller 110. The main controller 110 controls the input/output controller 150 to access another device on a network via the network I/F 108 or the network.

When the image processing apparatus 1 operates as a printer, the input/output controller 150 receives a printing job via the network I/F 108. The input/output controller 150 transfers the received printing job to the main controller 110. In response to receiving the printing job, the main controller 110 controls the image processor 130 to generate the drawing data based on document information or the image information contained in the printing job.

The engine controller 120 controls the print engine 106 to form an image on recording sheet that is transferred from the sheet feeding table 105 based on the drawing data generated by the image processor 130. In other words, the engine controller 120 and the print engine 106 function as an image forming unit. The print engine 106 may form an image using an inkjet image forming system or an electrophotographic image forming system. The recording sheet on which an image is formed is output to the sheet ejection tray 107.

Further, when the image processing apparatus 1 operates as a scanner, the operation display controller 140 receives a scanning instruction input from the display panel 104 according to a user operation, and transfers a scanning signal to the main controller 110. Alternatively, the input/output controller 150 receives a scanning instruction from an external terminal via the network I/F 108, and transfers a scanning signal to the main controller 110. The main controller 110 controls the engine controller 120 according to the received signal for scanning.

The engine controller 120 drives the ADF 101 to transfer a document to be scanned that is set at ADF 101 to the scanner 102. In addition, the engine controller 120 drives the scanner 102 to image the document that is transferred from the ADF 101. In a case where the document is set at the scanner 102 instead of the ADF 101, the scanner 102 images the document that is set at the scanner 102 under control of the engine controller 120. In other words, the scanner 102 and the engine controller 120 operate as an imaging unit and a reading control unit, respectively.

The scanner 102 includes an image pickup device such as a contact image sensor (CIS) or a charge-coupled device (CCD). In imaging operation, the image pickup device optically scans the document to generate imaging information based on optical information. The engine controller 120 transfers the imaging information generated by the scanner 102 to the image processor 130. The image processor 130 generates image information based on the imaging information received from the engine controller 120 under control of the main controller 110.

In response to receiving the image information generated by the image processor 130, the main controller 110 causes a storage medium such as the HDD 40 that is provided with the image processing apparatus 1 to store the image information. In other words, the scanner 102, the engine controller 120, and the image processor 130 operate in cooperation with one another to function as an image input unit. The image information generated by the image processor 130 is stored in the HDD 40 in accordance with a user operation. Alternatively, the image information is sent to an external apparatus via the input/output controller 150 or the network I/F 108.

Furthermore, when the image processing apparatus 1 operates as a copier, the image processor 130 generates drawing data based on the imaging information received by the engine controller 120 from the scanner 102, or the image information generated by the image processor 130. The engine controller 120 drives the print engine 106 based on the drawing data generated by the image processor 130 in substantially the same manner as described above in connection with the printing operation. When the drawing data and the imaging information are substantially same in format, the imaging information may be used as the drawing data.

Figure 3:
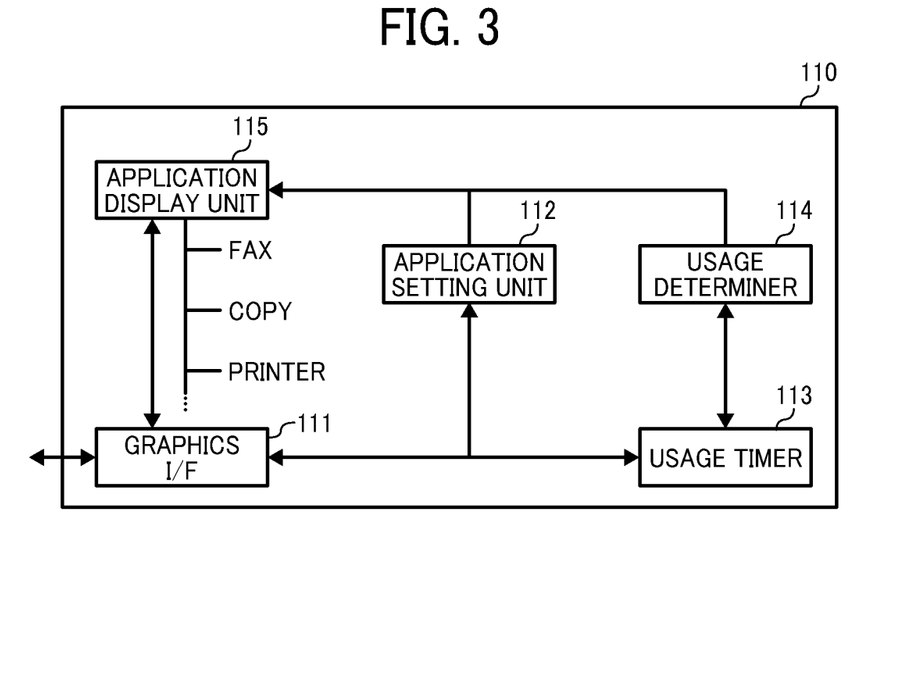
FIG. 3 is a block diagram illustrating a functional configuration of a main controller of the image processing apparatus of FIG. 1.

Hereinafter, a description is given of an exemplary functional configuration of the main controller 110 with reference to FIG. 3. As illustrated in FIG. 3, the main controller 110 according to this embodiment includes a graphics I/F 111, an application setting unit 112, a usage timer 113, a usage determiner 114, and an application display unit 115.

The graphics I/F 111 processes data that is input and output to and from the main controller 110.

The application setting unit 112 generates home screen setting information based on data that is input to the main controller 110 from the control panel 70 according to a user operation. The home screen setting information selects one or more applications to be displayed on the home screen among a plurality of applications installed on the image processing apparatus 1. More specifically, a plurality of icons, each being a symbol associated with the application selected by the home screen setting information, are displayed on the home screen. Further, the application setting unit 112 generates a setting of priority display for causing an operation screen of the selected application to be preferentially displayed on the LCD 60, while not requiring the user input on the home screen. For example, the application setting unit 112 may select application to be preferentially displayed for each one of a plurality of time slots of the day. The detail of this setting will be described later with reference to FIG. 9. The application setting unit 112 causes a storage medium such as the HDD 40 to store the home screen setting information specifying one or more application to be displayed on the home screen. The home screen is a screen that is displayed just after the image processing apparatus 1 is turned on and the OS boot-up ends. The home screen displays one or more symbols such as an icon or a shortcut used for activating the application installed on the image processing apparatus 1. In other words, the user starts operating the image processing apparatus 1 from the home screen.

The usage timer 113 measures a period of time each application is being used. Specifically, the application loaded to the RAM 20 is kept in a standby state until a signal for invoking the application is input. In response to the signal for invoking the application, the application starts processing for implementing the function of that application. Accordingly, the usage timer 113 starts measuring the period of time when the application is used from a time when the usage timer receives information indicating the signal for invoking the application that is in a standby state is input. This point of time corresponds to a time when a user starts manipulating an icon of the application via the control panel 70.

The usage determiner 114 determines whether the application is actually used based on the period of time when the application is being used. Further, the usage determiner 114 counts the number of times the application is used based on the determination result as to whether the application is actually used. In addition, the usage determiner 114 updates the counted number of times of use of the application to cause the storage medium such as the HDD 40 to store the updated number of times.

The application display unit 115 refers to the information stored in the storage medium such as the HDD 40, including the home screen setting information, the setting of priority display, and the number of times of use of the application, to select an application to be displayed on the LCD 60. Specifically, the application display unit 115 invokes the application that is loaded to the RAM 20 to display an operation screen of the invoked application on the LCD 60.

Figure 4:
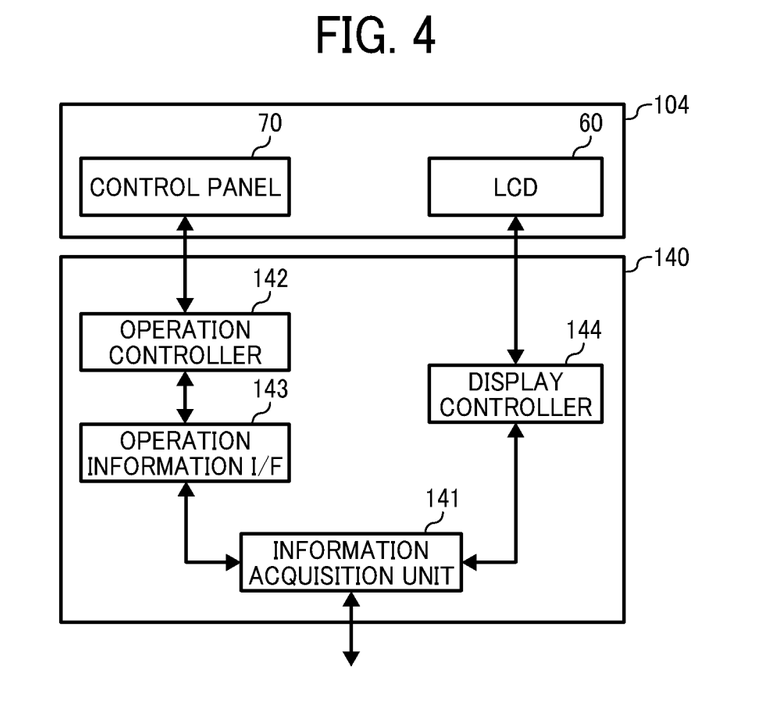
FIG. 4 is a block diagram illustrating a functional configuration of an operation display controller of the image processing apparatus 1 of FIG. 1.

Hereinafter, a description is given of configurations of the operation display controller 140 and the display panel 104 with reference to FIG. 4. As illustrated in FIG. 4, the operation display controller 140 according to this embodiment includes an information acquisition unit 141, an operation controller 142, an operation information I/F 143, and a display controller 144.

The information acquisition unit 141 processes data that is input or output to or from the operation display controller 140. The operation controller 142 receives a signal input from the control panel 70 according to a user's operation. The operation controller 142 outputs the received signal to the operation information I/F 143. The operation information I/F 143 outputs the signal received from the operation controller 142 to the information acquisition unit 141 in a format that can be processed by the controller 100. The display controller 144 displays information that is output from the information acquisition unit 141 on the LCD 60.

With such configuration, the image processing apparatus 1 according to this embodiment displays, on the LCD 60, an operation screen of an application that is frequently used. Specifically, the image processing apparatus 1 counts the number of times the application is used based on a period of time when the application has been used since the application was invoked. Further, the image processing apparatus 1 according to this embodiment displays the operation screen of the application that is frequently used by a user based on the counted number of times of use of the application. With such configuration and operation, a user is able to operate the image processing apparatus 1 in a simple manner.

Figure 5:
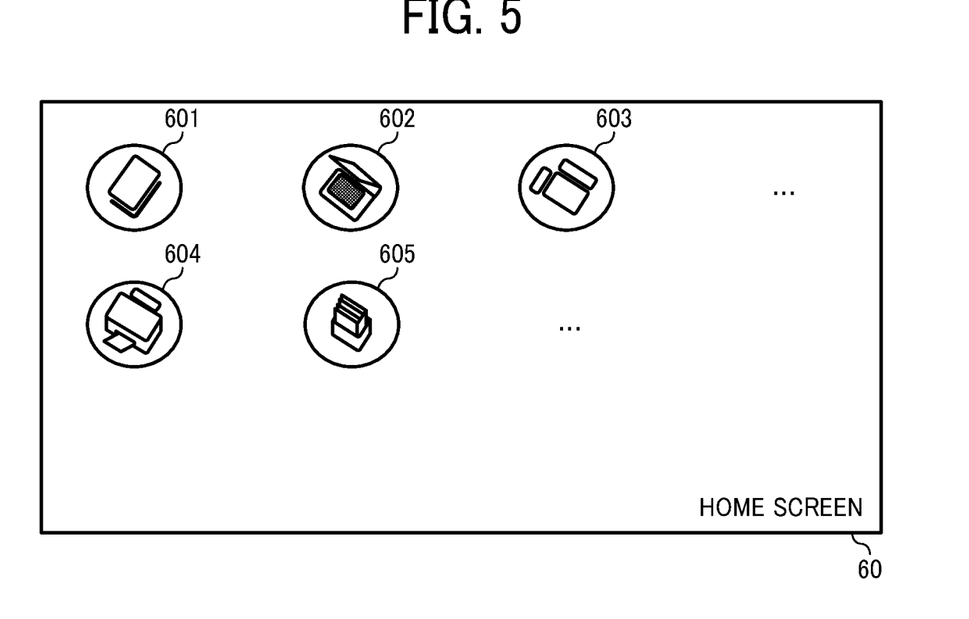
FIG. 5 is a view for describing a home screen displayed on a display panel according to an embodiment of the present invention.

FIG. 5 illustrates an exemplary view of the home screen displayed on the LCD 60 based on the home screen setting information stored in the storage medium such as the HDD 40. As illustrated in FIG. 5, the home screen displayed on the LCD 60 includes a plurality of icons, each being associated with a function provided by the application. In FIG. 5, a copy icon 601, a scanner icon 602, a facsimile icon 603, a printer icon 604, and a document storage icon 605 are displayed, which are associated with a copier function, a scanner function, a facsimile function, a printer function, and a document storage function, respectively.

The image processing apparatus 1 according to this embodiment refers to the home screen setting information set by the application setting unit 112 to automatically, preferentially display the operation screen of the application associated with an icon that is set to be displayed on the home screen. One or more icons to be displayed on the home screen are set based on a user instruction input through the control panel 70. Accordingly, the operation screen of an application associated with an icon that is not displayed on the home screen is not preferentially displayed. To delete or add a desired application on the home screen, the user operates the control panel 70 to delete or add an icon corresponding to the desired application from or to the home screen. Alternatively, the user may operate the control panel 70 to move a desired icon from the home screen to another screen.

Figure 6:
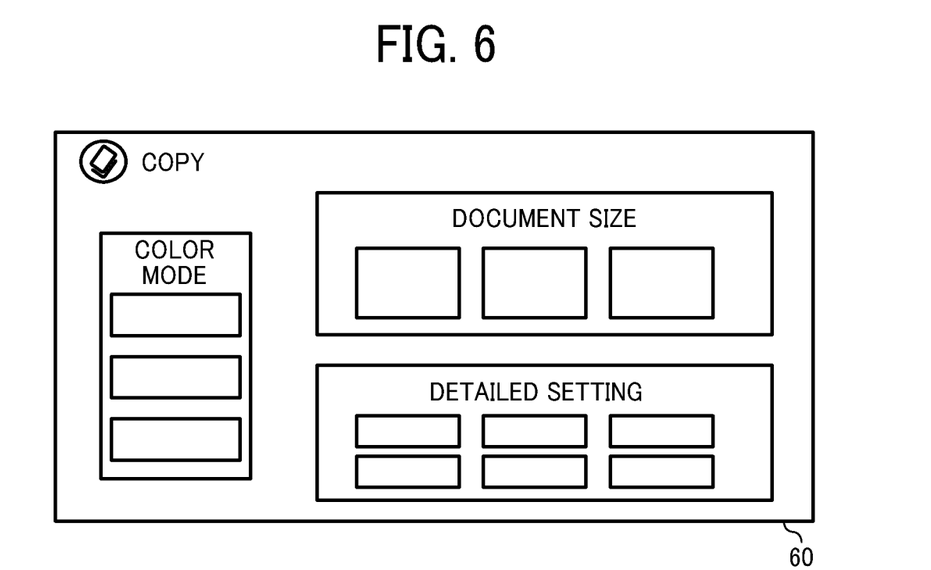
FIG. 6 is a view for describing an operation screen of an application displayed on a display panel according to an embodiment of the present invention.

The user who wants to use a copier application usually selects the copy icon 601 on the home screen to display the operation screen of the copier application on the LCD 60. FIG. 6 is a view illustrating an example of the operation screen of the copier application displayed on the LCD 60.

The operation screen of each application such as the operation screen of the copier application as illustrated in FIG. 6 is usually displayed on the LCD 60 when the corresponding icon as illustrated in FIG. 5 is touched by the user. By contrast, in the image processing apparatus 1 according to this embodiment, the operation screen of the application as illustrated in FIG. 6 is automatically displayed even when there is no user's operation of touching the icon on the home screen, when a predetermined condition is satisfied.

Specifically, the operation screen of the application is automatically displayed when the image processing apparatus 1 has not performed any processing for a predetermined period of time. More specifically, the operation screen of the application is automatically displayed when the image processing apparatus 1 is in an unused state, that is, for example, when no printing job is input to the image processing apparatus 1, any one of the installed applications has not been executed for a predetermined period of time, and the control panel 70 has not been operated for a predetermined period of time. Thus, the operation such as touching the icon on the home screen can be omitted when utilizing each application including the copier function.

Figure 7:
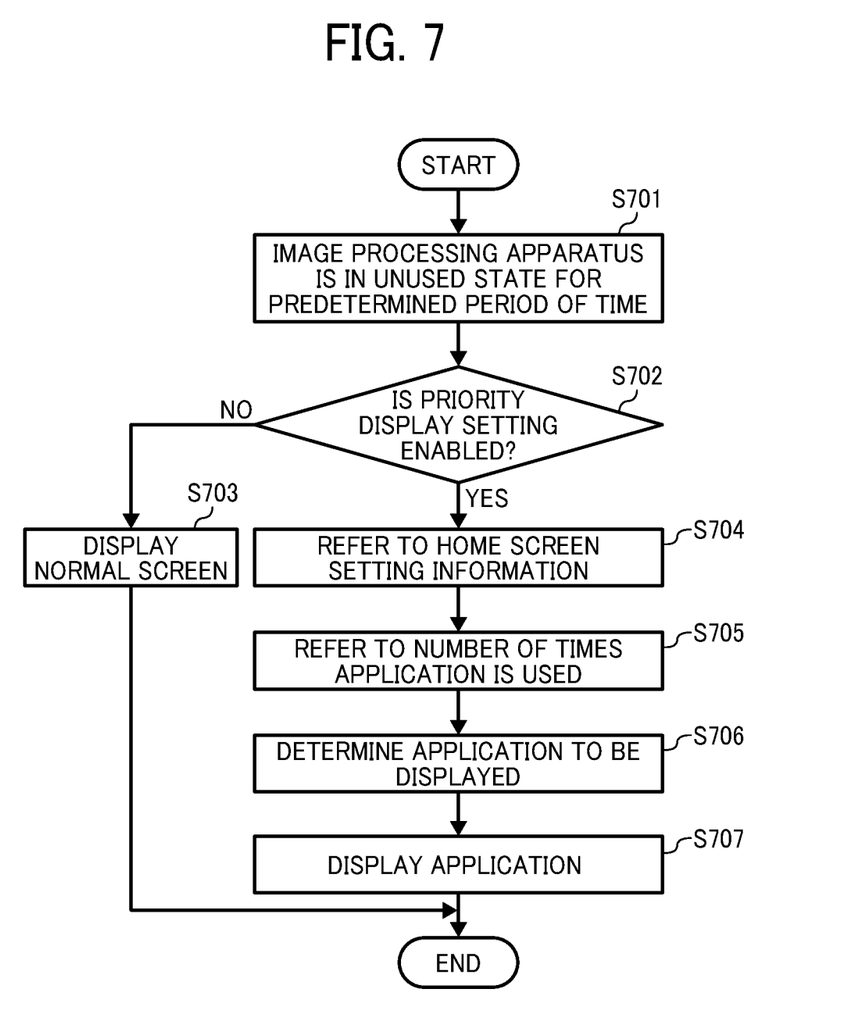
FIG. 7 is a flowchart illustrating an operation of displaying an operation screen of an application according to an embodiment of the present invention.

Hereinafter, a description is given of an operation of displaying the operation screen of the application without the user input on the home screen with reference to FIG. 7. When the image processing apparatus 1 according to this embodiment is in the unused state (S701), the main controller 110 determines whether the setting of priority display of the application is enabled (S702).

When the main controller 110 determines that the setting of priority display is not enabled (S702: NO), the main controller 110 instructs the operation display controller 140 to perform display on the LCD 60 in substantially the same manner as a normal mode (S703). In the normal mode, for example, the operation display controller 140 displays the home screen, turns off the screen in response to transition to an energy saving mode, or displays a screen for confirming the setting of priority display on the LCD 60 under control of the main controller 110.

When the main controller 110 determines that the setting of priority display is enabled (S702: YES), the application display unit 115 acquires the home screen setting information set by the application setting unit 112 from the storage medium such as the HDD 40 (S704). Then, the application display unit 115 acquires the information on the number of times the application is used, which is counted by the usage determiner 114, from the storage medium such as the HDD 40 (S705). The application display unit 115 determines which application is to be preferentially displayed on the LCD 60 based on the information acquired at S704 and S705 (S706).

The process at S705 may precede the process at S704, and vice versa. For example, even though a certain application is set to be displayed on the home screen, the operation screen of the certain application is not preferentially displayed in a case where the number of times the certain application is used is small. Further, even though the number of times a certain application is used is largest, the operation screen of the certain application is not preferentially displayed in a case where the certain application is not set to be displayed on the home screen.

The application display unit 115 sends information on the application to be preferentially displayed to the operation display controller 140 via the graphics I/F 111. The operation display controller 140 acquires the information on the application to be preferentially displayed via the information acquisition unit 141, and outputs the acquired information to the display controller 144. The display controller 144 displays, on the LCD 60, the operation screen (see FIG. 6) of the application that is determined to be preferentially displayed based on the information received from the operation display controller 140.

With such procedure, the image processing apparatus 1 determines the application to be preferentially displayed, and displays the operation screen of the determined application on the LCD 60. Alternatively, the application to be preferentially displayed may be set as follows.

Figure 8:
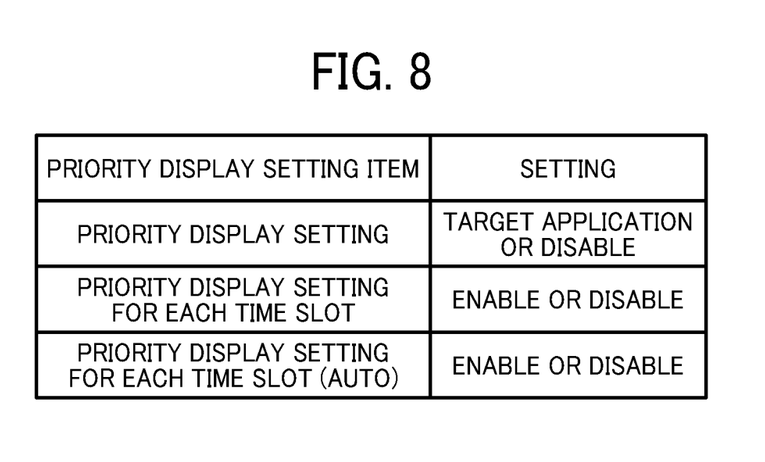
FIG. 8 is a view illustrating an example of setting information of application display according to an embodiment of the present invention.

FIG. 8 is a view illustrating an example of the setting of priority display set by the application setting unit 112. The user operates the control panel 70 to enter an item relating to the setting of priority display. The setting of priority display is enabled or disabled according to an instruction input from the control panel 70 according to the user operation. In a case where the setting of the priority display is enabled, the application to be preferentially displayed is also set according to an instruction input from the control panel 70 according to the user operation.

Figure 9:
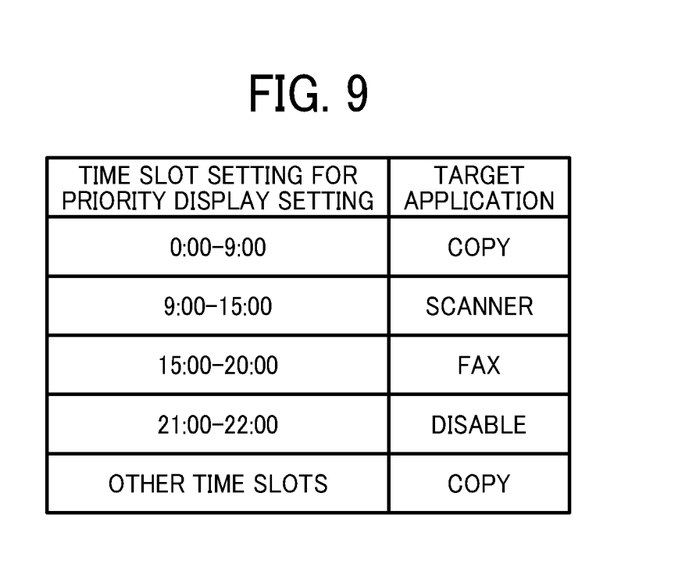
FIG. 9 is a view illustrating an example of setting information of application display associated with different periods of time according to an embodiment of the present invention.

FIG. 9 is a view illustrating an example of setting information specifying the application to be preferentially displayed for each time slot. As illustrated in FIG. 9, the setting of priority display may associate different time slots with the different application, respectively. Specifically, the application to be preferentially displayed is set for each time slot. For example, according to the setting as illustrated in FIG. 9, the operation screen of the copier application is preferentially displayed from 12 AM to 9 AM, and the operation screen of the scanning application is preferentially displayed from 9 AM to 3 PM. In addition, the setting of the priority display is disabled in a time slot during which the image processing apparatus 1 is hardly used. In an example of FIG. 9, the setting of the priority display is disabled from 9 PM to 10 PM.

Alternatively, as described above with reference to FIG. 7, the image processing apparatus 1 automatically selects the application to be preferentially displayed instead of the application specified by the user, and displays the operation screen of the automatically selected application on the LCD 60. In order to automatically select the application to be preferentially displayed, the main controller 110 counts, for each of the different applications, the number of times the application is used, and causes the storage medium to store the counted number of times in association with each application. Hereinafter, a description is given of an operation of counting the number of times the application is used with reference to FIG. 10.

Figure 10:
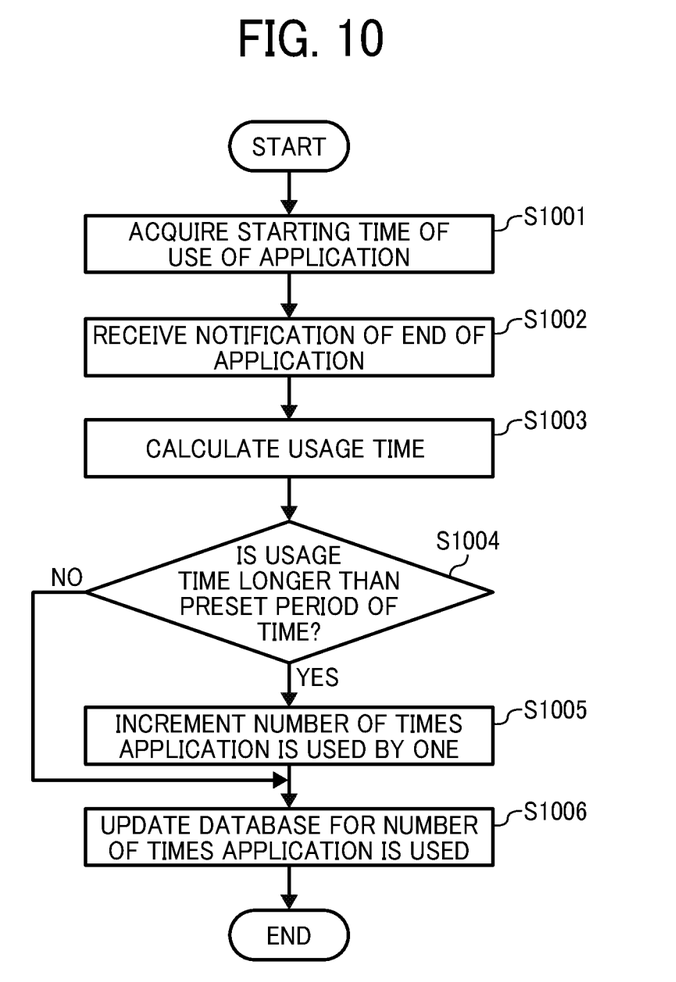
FIG. 10 is a flowchart illustrating an operation of counting the number of times an application is used according to an embodiment of the present invention.

The usage timer 113 receives, from the graphics I/F 111, information indicating that the application is invoked in response to an input from the control panel 70 according to the user operation. In response to receiving such information, the usage timer 113 acquires a starting time when the use of the application is started (S1001). Further, the usage timer 113 receives a notification indicating that the use of the application ends (S1002). Then, the usage timer 113 calculates the period of time when the application is used based on the starting time acquired at S1001 and the time when the usage timer 113 received the notification at S1002 (S1003). The notification indicating that the use of the application ends includes a signal of a content of operation of the control panel 70 and a signal indicating a series of processes executed by the application ends.

The usage determiner 114 compares the calculated period of time when the application is used and a predetermined period of time, which is set for each application (S1004). The detailed description of the predetermined period of time set for each application is given later with reference to FIG. 11. When the comparison result indicates that the calculated period of time when the application is used is shorter than the set period of time (S1004: NO), the usage determiner 114 does not increment the number of times of use of the application. When the comparison result indicates that the calculated period of time when the application is used is equal to or longer than the set period of time (S1004: YES), the usage determiner 114 increments the number of times of use of the application by one (S1005). Further, the usage determiner 114 summarizes the number of times the application is used to update the information on the number of times the application is used (S1006).

When the user operates the control panel 70 to make an input with the display panel 104 supporting the touch panel system, the user sometimes touch an icon or a point different from what the user intends. If the application is activated in response to such erroneous input and the number of times of use of the application is incremented accordingly, the number of use of the application counted by the usage determiner 114 does not reflect the actual use of the application. The image processing apparatus 1 according to this embodiment does not increment the number of times of use of the application in a case where the application has been used for a shorter period of time than the predetermined period of time. Thus, the number of times of use of the application is counted accurately based on the actual use of the application.

Figure 11:
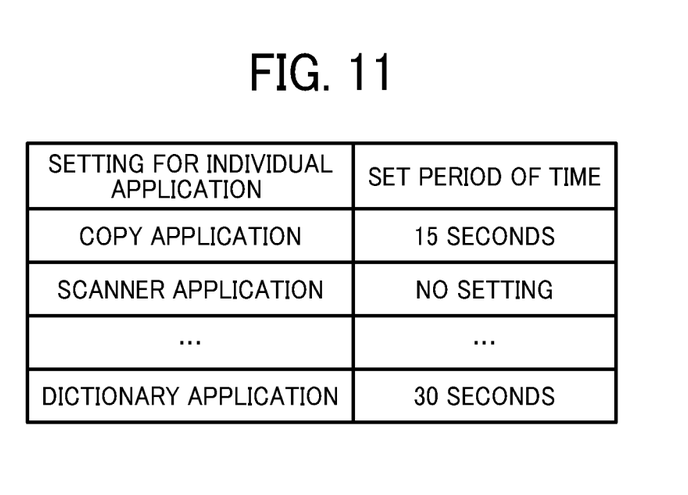
FIG. 11 is a view illustrating an example of a setting of a time period used when counting the number of times each application is used according to an embodiment of the present invention.

Further, the predetermined period of time that is used for counting the number of times of use of the application may be varied depending on a function implemented by the application. FIG. 11 is a view illustrating an example of a setting of the period of time for use in counting the number of times each application is used. The length of time it takes to display the operation screen of the application on the LCD 60 in response to the user's operation of the corresponding icon varies depending on each application. Accordingly, the timing when the user notices the user's operation mistake also often varies depending on each application. As illustrated in FIG. 11, the different periods of time, which are used for counting the number of times the application is used, are set respectively for the plurality of applications. With such setting, the number of times each application is used is counted more precisely without being influenced by the user's operation mistake. The application setting unit 112 may set the different periods of time respectively for the different applications in accordance with an instruction input from the control panel 70 according to the user operation. The application setting unit 112 causes the storage medium such as the HDD 40 to store such setting information.

Figure 12:
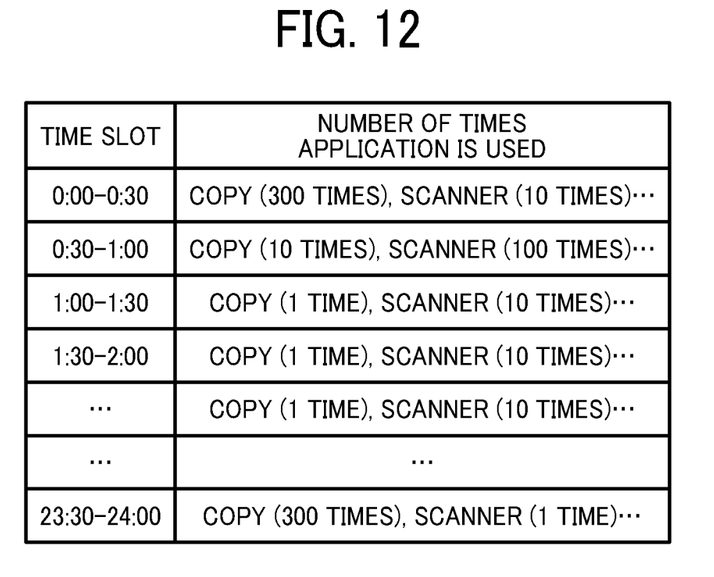
FIG. 12 is a view illustrating an example of stored data indicating the number of times each application is used in associated with each time slot according to an embodiment of the present invention.

FIG. 12 is a view illustrating an example of data stored in the storage medium such as the HDD 40, indicating the number of times each application is used in association with each time slot. In an example of FIG. 12, the usage determiner 114 counts up the numbers of times of use of the application every 30 minutes to update the information stored in the storage medium such as the HDD 40. Thus, the storage medium such as the HDD 40 stores the number of times each application is used counted by the usage determiner 114. Note that, a time interval at which the numbers of times of use of the application are counted up may be determined in accordance with an instruction input from the control panel 70 according to a user operation.

Figure 13:
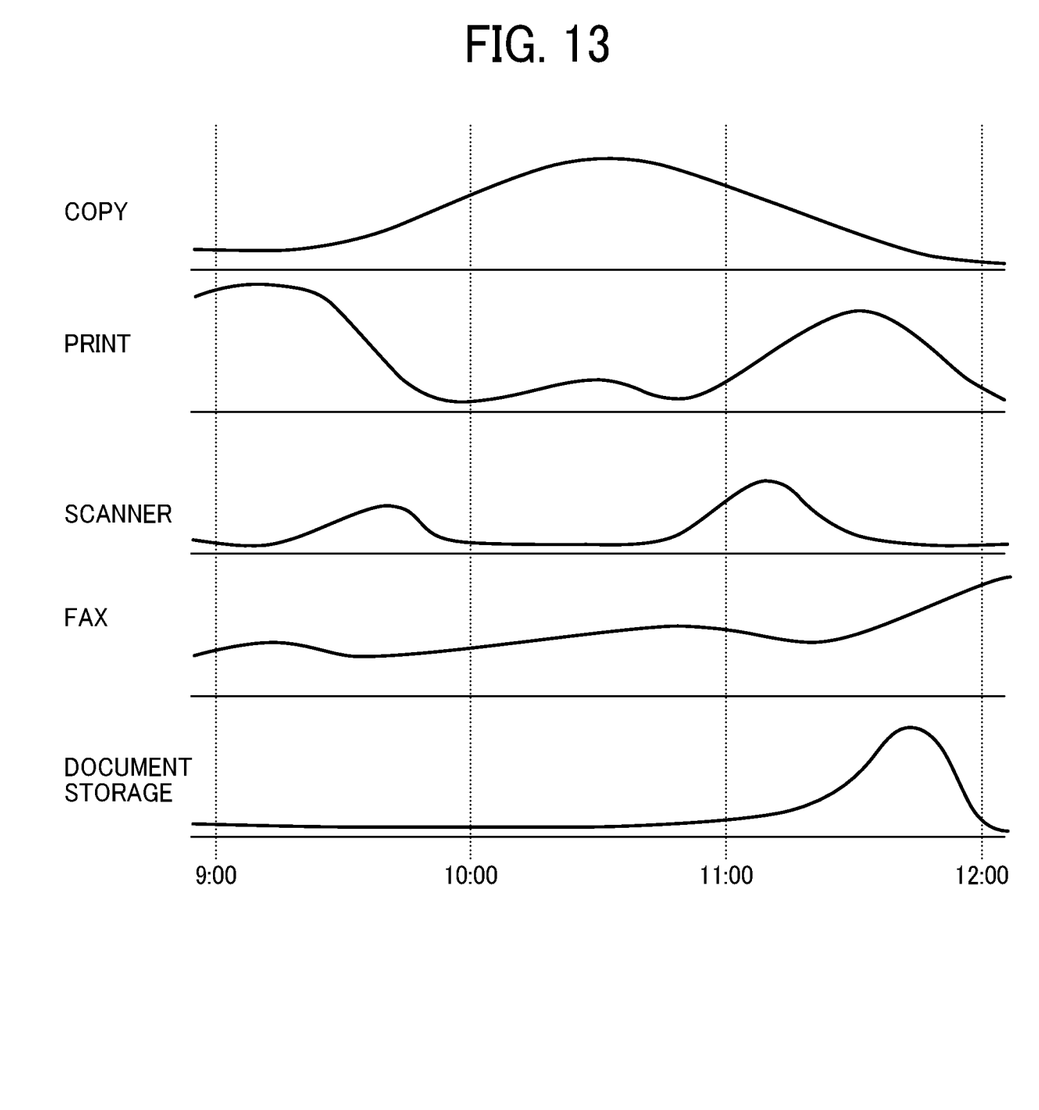
FIG. 13 is a schematic view illustrating the frequency of use of each application during each time slot according to an embodiment of the present invention.

FIG. 13 is a schematic view illustrating an example of how frequently each application is used during each time slot. According to an example of FIG. 13, a printing application is used most frequently from 9 AM to 10 AM. In such case, an operation screen of the printing application is displayed on the LCD 60 in a case where the printer icon 604 is set to be displayed on the home screen according to the home screen setting information.

As described heretofore, the image processing apparatus 1 according to this embodiment counts the number of times of actual use of the application by the user to preferentially display the operation screen of the application that is frequently used. The image processing apparatus 1 according to this embodiment does not count the activation of the application in response to the user's erroneous operation when counting the number of times of use of the application. Accordingly, the operation screen of the application is preferentially displayed more accurately based on the actual usage situation of the application. In addition, the image processing apparatus 1 is also able to preferentially display the application that is specified by the user. Accordingly, the image processing apparatus 1 is able to provide the function thereof in more convenient manner.

The present invention is not limited to the details of the example embodiments described above, and various modifications and improvements are possible. For example, depending on the plurality of time slots, the operation screen of the application is preferentially displayed in accordance with the priority display setting specified by the user or the priority display setting for automatically selecting the application based on the number of times of use of the application.

Figure 14:
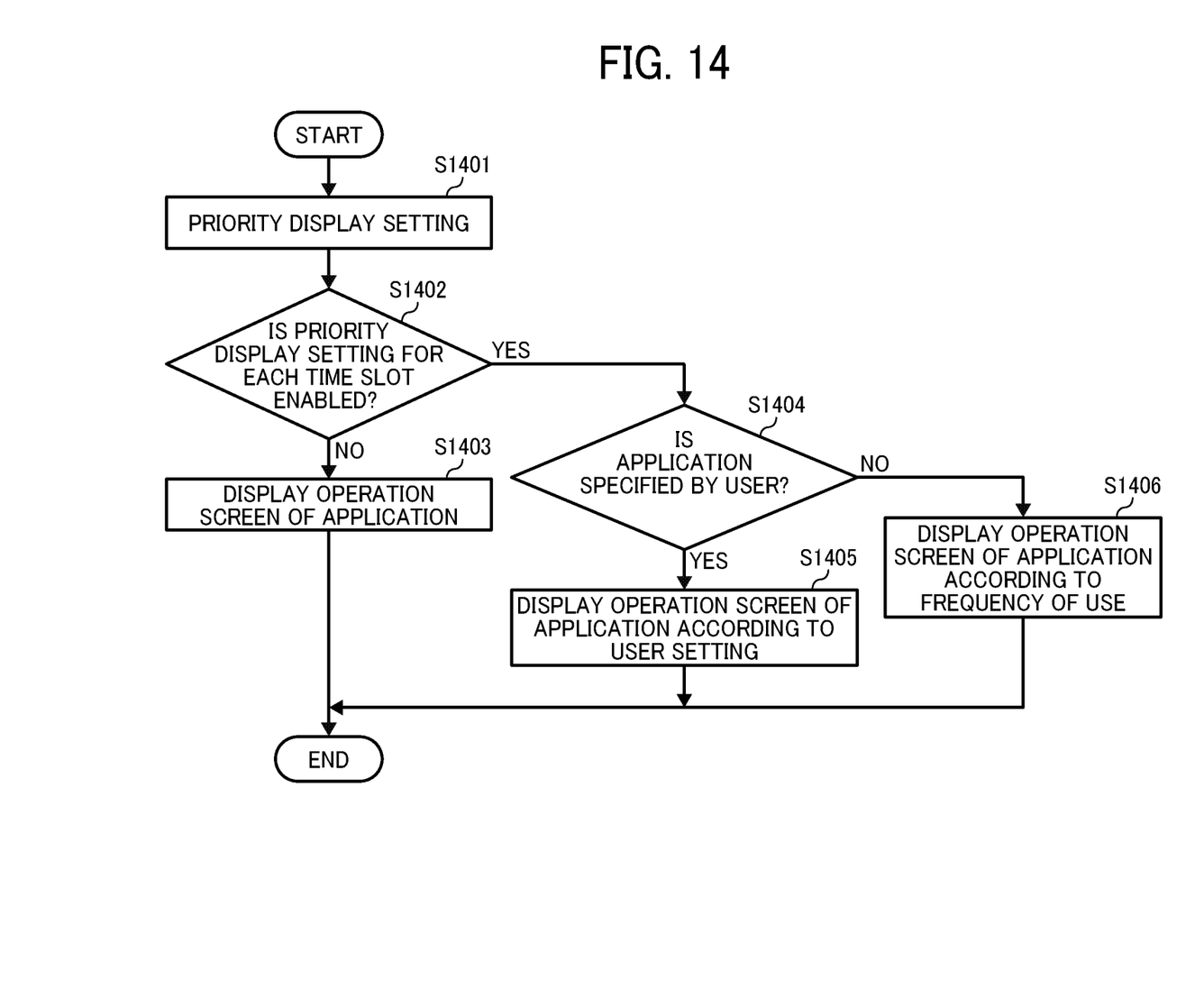
FIG. 14 is a flowchart illustrating an operation of identifying a setting mode of a priority display setting according to an embodiment of the present invention.

FIG. 14 is a flowchart illustrating an exemplary operation of identifying a setting mode of the priority display setting. Hereinafter, a description is given of an operation executed when the image processing apparatus 1 is in the unused state and the setting of the priority display is enabled (S1401) in substantially the same manner as in S702. First, the application display unit 115 refers to the setting information that is set by the application setting unit 112 and stored in the storage medium such as the HDD 40 to determine whether the priority display of the application is set for each time slot (S1402).

When the application display unit 115 determines that the priority display of the application is not set for each time slot (S1402: NO), the application display unit 115 invokes the application corresponding to the setting information. The graphics I/F 111 outputs information for displaying the operation screen of the invoked application to the operation display controller 140. The information acquisition unit 141 sends the information received from the graphics I/F 111 to the display controller 144. The display controller 144 displays the operation screen of the application on the LCD 60 in accordance with the information received from the information acquisition unit 141 (S1403). In other words, at S1403, the operation screen of a specific application that is specified in accordance with an instruction input from the control panel 70 according to a user operation is displayed regardless of any time slots, when the image processing apparatus 1 is in the unused state.

By contrast, when the application display unit 115 determines that the priority display of the application is set for each time slot (S1402: YES), the application display unit 115 refers to the setting information that is set by the application setting unit 112 and stored in the storage medium such as the HDD 40 to determine whether the application to be preferentially displayed is specified by the user for each time slot (S1404). In other words, the application display unit 115 determines whether the setting of priority display includes information as illustrated in FIG. 9.

When the application display unit 115 determines that the application to be preferentially displayed is specified by the user for each time slot (S1404: YES), the application display unit 115 invokes the application corresponding to the setting information. The graphics I/F 111 outputs information for displaying the operation screen of the invoked application to the operation display controller 140. The information acquisition unit 141 sends the information received from the graphics I/F 111 to the display controller 144. The display controller 144 displays the operation screen of the application on the LCD 60 in accordance with the information received from the information acquisition unit 141 (S1405: scheduled setting application display). In other words, at S1405, the operation screen of the application that is set for each time slot in accordance with an instruction input from the control panel 70 according to a user operation is displayed, when the image processing apparatus 1 is in the unused state.

When the application display unit 115 determines that the application to be preferentially displayed is not specified by the user for each time slot (S1404: NO), the application display unit 115 refers to the information on the number of times of use of the application, which is counted by the usage determiner 114 and stored in the storage medium such as the HDD 40. Subsequently, the application display unit 115 determines the application to be displayed on the LCD 60 in substantially the similar way as the processing from S704 to S706. Therefore, redundant descriptions of an operation of determining the application to be displayed on the LCD 60 are omitted below. Note that, in the processing corresponding to S705, the application display unit 115 refers to the information on the number of times of use of the application, which is counted by the usage determiner 114 for each time slot as illustrated in FIG. 12. Then, in the processing corresponding to S706, the application display unit 115 determines which application is to be displayed on the LCD 60 based on the information on the number of times of use of the application corresponding to the current time.

The graphics I/F 111 outputs information for displaying the operation screen of the application that is determined to be displayed on the LCD 60 to the operation display controller 140. The information acquisition unit 141 sends the information received from the graphics I/F 111 to the display controller 144. The display controller 144 displays the operation screen of the application on the LCD 60 in accordance with the information received from the information acquisition unit 141 (S1406: automatic application display). In other words, at S1406, the operation screen of the application selected based on the frequency of use is displayed on the LCD 60, when the image processing apparatus 1 is in the unused state (see FIG. 7).

As described above, depending on the plurality of time slots, the application to be preferentially displayed may be determined in accordance with the setting specified by the user or automatically selected based on the number of times of use of the application. With such configuration and operation, the operation screen of the application is preferentially displayed based on how the user actually uses the image processing apparatus 1.

Figure 15:
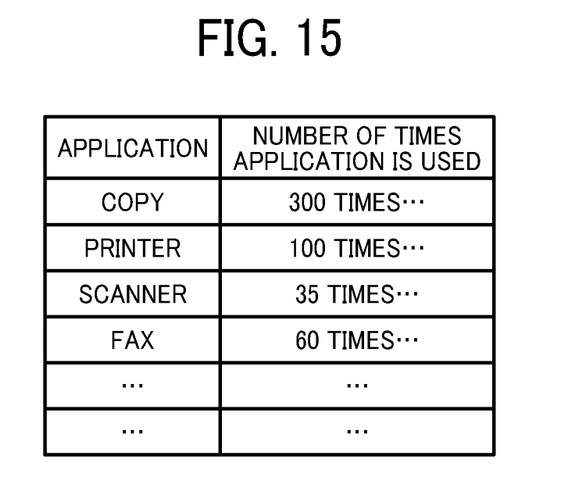
FIG. 15 is an example of stored data indicating the number of times each application is used throughout all time slots according an embodiment of the present invention.

Note that, as illustrated in FIG. 15, the usage determiner 114 may count the number of times of use throughout all time slots, for each of the applications installed on the image processing apparatus 1, and causes the storage medium such as the HDD 40 to store the counted number of times of use. In this case, the application display unit 115 determines the application to be preferentially displayed based on the number of times of use counted throughout all time slots, and displays the operation screen of the determined application on the LCD 60.

Each function in the above-described embodiments may be implemented by a program described in C, C++, C# or Java (registered trademark). The program may be provided using any storage medium that is readable by an apparatus, such as a hard disk drive, compact disc (CD) ROM, magneto-optical disc (MO), digital versatile disc (DVD), a flexible disc, erasable programmable read-only memory (EPROM), or electrically erasable PROM. Alternatively, the program may be transmitted via network such that other apparatus can receive it.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, the network can comprise any conventional terrestrial or wireless communications network, such as the Internet.

What is claimed is:

1. An image processing apparatus comprising:
circuitry configured to
count a number of times of use, for each respective application program of a plurality of application programs installed on the image processing apparatus, each time of use being counted when the respective application program has been activated for at least a determined time period,
control a display to output a plurality of graphical representations, each of the plurality of graphical representations corresponding to one of the plurality of application programs,
select an application program of the plurality of application programs having a greatest counted number of times of use, and
control a display to output an operation screen of the selected application program when the image processing apparatus is in an unused state, the control of the display to output the operation screen of the selected application program being performed in response to determining that the selected application program corresponds to a graphical representation of a subset of the plurality of graphical representations, the subset of the plurality of graphical representations being set to be displayed on a home screen.

2. The image processing apparatus according to claim 1, wherein the circuitry is configured to
count the number of times of use on a time slot basis for each of the plurality of application programs, and
select an application program of the plurality of application programs having the greatest counted number of times of use for a current time slot of a plurality of time slots, the current time slot corresponding to a current time.

3. The image processing apparatus according to claim 2, wherein the circuitry is configured to select the application program having the greatest counted number of times of use for the current time slot in response to determining that a time slot setting is enabled for the plurality of time slots.

4. The image processing apparatus according to claim 3, wherein the circuitry is configured to determine that the time slot setting is enabled based on a received instruction.

5. The image processing apparatus according to claim 3, wherein the circuitry is configured to determine that the time slot setting is enabled based on a received instruction.

6. The image processing apparatus according to claim 2, wherein the circuitry is configured to select the application program having the greatest counted number of times of use for the current time slot in response to determining that a time slot setting is enabled for the current time slot of the plurality of time slots.

7. The image processing apparatus according to claim 1, wherein the determined time period is configured for each of the plurality of application programs.

8. The image processing apparatus according to claim 7, wherein the determined time period varies for each particular application program of the plurality of application programs based on a length of time taken to display the operation screen of the particular application program in response to receiving an instruction to execute the particular application program.

9. The image processing apparatus according to claim 1, wherein, the circuitry is configured to
receive an input that reselects a graphical representation of the plurality of graphical representations output by the display after the control of the display to output the operation screen of the selected application program is performed, and
re-control the display to output the operation screen of a specific application program among the plurality of application programs corresponding to the reselected graphical representation when the image processing apparatus is in the unused state.

10. The image processing apparatus according to claim 1, wherein the circuitry is configured to determine whether to reselect an application program of the plurality of application programs based on a first mode and a second mode after the control of the display to output the operation screen of the selected application program is performed when the image processing apparatus is in the unused state, the application program having the greatest counted number of times of use is reselected in the first mode, and an application program identified by an instruction received from an external source is reselected in the second mode.

11. The image processing apparatus according to claim 1, wherein the circuitry is configured to selects the subset of the plurality of graphical representations based on a received instruction.

12. The image processing apparatus according to claim 1, wherein the circuitry is configured to control the display to output the operation screen of the selected application program in response to determining that the selected application program has a number of times of use higher than a determined threshold.

13. The image processing apparatus according to claim 1, wherein the circuitry is configured to control the display to output the operation screen of the selected application program in response to determining that the control of the display to output the operation screen of the selected application program has been enabled.

14. The image processing apparatus according to claim 13, wherein the circuitry enables the control of the display to output the operation screen of the selected application program based on a received instruction.

15. The image processing apparatus according to claim 1, wherein the image processing apparatus enters the unused state in response to determining that
   none of the plurality of application programs have been operated for a period of time, and
   a control panel of the image processing apparatus has not been operated for the period of time.

16. The image processing apparatus according to claim 1, wherein the circuitry is configured to recount the number of times of use after a determined duration.

17. The image processing apparatus according to claim 1, wherein the circuitry is configured to
   count the number of times of use on a time slot basis for each of the plurality of application programs,
   select an application program of the plurality of application programs having the greatest counted number of times of use for a first time slot of a plurality of time slots, and
   reselect an application program of the plurality of application programs identified by an instruction received from an external source for a second time slot of the plurality of time slots.

18. The image processing apparatus according to claim 1, further comprising:
   the display including a touch panel,
   wherein the circuitry is configured to control the display to output a user interface including at least one of
      the plurality of graphical representations, or
      the operation screen of the selected application program.

19. A non-transitory machine-readable recording medium storing a program for causing an image processing apparatus to perform a method for controlling operation of the image processing apparatus that, when executed by at least one processor of the image processing apparatus, causes the at least one processor to:
   count a number of times of use, for each respective application program of a plurality of application programs installed on the image processing apparatus, each time of use being counted when the respective application program has been activated for at least a determined time period;
   control a display to output a plurality of graphical representations, each of the plurality of graphical representations corresponding to one of the plurality of application programs;
   select an application program of the plurality of application programs having a greatest counted number of times of use; and
   control the display to output an operation screen of the selected application program when the image processing apparatus is in an unused state, the control of the display to output the operation screen of the selected application program being performed in response to determining that the selected application program corresponds to a graphical representation of a subset of the plurality of graphical representations, the subset of the plurality of graphical representations being set to be displayed on a home screen.

20. A method for controlling operation of an image processing apparatus, comprising:
   counting a number of times of use, for each respective application program of a plurality of application programs installed on the image processing apparatus, each time of use being counted when the respective application program has been activated for at least a determined time period;
   controlling a display to output a plurality of graphical representations, each of the plurality of graphical representations corresponding to one of the plurality of application programs;
   selecting an application program of the plurality of application programs having a greatest counted number of times of use; and
   controlling the display to output an operation screen of the selected application program when the image processing apparatus is in an unused state, the controlling the display to output the operation screen of the selected application program being performed in response to determining that the selected application program corresponds to a graphical representation of a subset of the plurality of graphical representations, the subset of the plurality of graphical representations being set to be displayed on a home screen.

* * * * *